(12) United States Patent
Flather

(10) Patent No.: US 7,905,224 B2
(45) Date of Patent: Mar. 15, 2011

(54) BEVERAGE WARMER APPARATUS

(75) Inventor: Charles Flather, Delray Beach, FL (US)

(73) Assignee: Charles Flather, Delray Beach, FL (US)

( * ) Notice: Subject to any disclaimer, the term of this patent is extended or adjusted under 35 U.S.C. 154(b) by 1064 days.

(21) Appl. No.: 11/675,211

(22) Filed: Feb. 15, 2007

(65) Prior Publication Data

US 2008/0197138 A1     Aug. 21, 2008

(51) Int. Cl.
  *A47J 36/26* (2006.01)
  *A47J 36/30* (2006.01)
  *F24C 3/14* (2006.01)
  *F24C 1/16* (2006.01)

(52) U.S. Cl. .......... 126/25 A; 126/261; 126/262; 126/43

(58) Field of Classification Search .............. 126/43–45, 126/25 A, 25 AA, 40, 261, 262
See application file for complete search history.

(56) References Cited

U.S. PATENT DOCUMENTS

| | | | | |
|---|---|---|---|---|
| 188,424 A | * | 3/1877 | Shields | 126/45 |
| 1,222,571 A | * | 4/1917 | Ball | 220/630 |
| 1,254,019 A | * | 1/1918 | Ball | 126/43 |
| 1,351,682 A | * | 8/1920 | Popper | 126/43 |
| 2,219,170 A | | 8/1939 | Bailey | |
| 2,590,418 A | * | 3/1952 | Kobler et al. | 126/261 |
| 3,205,886 A | * | 9/1965 | Wei | 126/261 |
| D213,717 S | * | 4/1969 | Rickmeirer, Jr. | D7/355 |
| D213,899 S | * | 4/1969 | Rickmeier, Jr. | D7/355 |
| D222,736 S | * | 12/1971 | Stier | D7/355 |
| 4,102,323 A | | 7/1978 | Pritz | |
| 4,432,338 A | | 2/1984 | Buchmann | |
| 4,621,609 A | | 11/1986 | Kitchen | |
| 5,197,454 A | * | 3/1993 | Lee | 126/9 R |
| 5,283,420 A | | 2/1994 | Montalto | |
| 5,619,905 A | | 4/1997 | Wu | |

(Continued)

FOREIGN PATENT DOCUMENTS

DE     32 20 527     * 12/1983

(Continued)

OTHER PUBLICATIONS

ALIBABA.COM, "USB Chiller & Warmer", 4 pages article. http://hxbloc.en.alibaba.com/offerdetail/54453920/Sell_USB_Chiller_amp_Warmer.html, website last visited Feb. 15, 2007.

*Primary Examiner* — Carl D Price
(74) *Attorney, Agent, or Firm* — Pablo Meles; Guntin Meles & Gust, PLC

(57) ABSTRACT

A beverage warmer apparatus (10) can include a vertically adjustable platform (17) for holding a self-contained heating element (20) (such as a tea light candle, Sterno can, or other heating element), a gear (54) or pulley mechanism (18 and 22) for adjusting the height of the vertically adjustable platform, a support structure (16) anchored at least in part to the vertically adjustable platform, and a top planar member (12) having an opening (14) and further supported by the support structure. The apparatus can further include a bottom planar member (13) coupled to the support structure. The vertically adjustable platform can be an L-shaped member for holding a horizontally slidable planar member (15) that holds the self-contained heating element. The support structure 16 can have posts or walls coupled to the top planar member or the bottom planar member.

24 Claims, 4 Drawing Sheets

U.S. PATENT DOCUMENTS

| | | | |
|---|---|---|---|
| 5,722,387 A * | 3/1998 | Chen | 126/45 |
| 5,758,635 A | 6/1998 | Petersen | |
| 5,803,587 A * | 9/1998 | Chen | 362/161 |
| 6,035,768 A | 3/2000 | Kaufman | |
| 6,234,786 B1 | 5/2001 | Wagner | |
| 6,895,145 B2 | 5/2005 | Ho | |
| 7,067,772 B2 | 6/2006 | Tanner et al. | |
| 7,132,084 B1 | 11/2006 | Roumpos | |
| 2005/0076795 A1 | 4/2005 | Riddle | |
| 2005/0120715 A1 | 6/2005 | Labrador | |
| 2005/0238775 A1 | 10/2005 | Amodei | |
| 2006/0093979 A1 | 5/2006 | Varanasi et al. | |
| 2006/0225724 A1 | 10/2006 | Turner | |
| 2006/0240371 A1 | 10/2006 | Palmer | |

FOREIGN PATENT DOCUMENTS

| | | | |
|---|---|---|---|
| DE | 3303049 A1 | * | 7/1984 |
| DE | 29601061 | * | 1/1996 |
| DE | 10306878 A1 | * | 7/2004 |
| DE | 202004009896 U1 | * | 11/2004 |
| DE | 10342402 | * | 10/2005 |
| FR | 2589709 | * | 5/1987 |
| FR | 2745163 | * | 8/1997 |
| JP | 58145826 A | * | 8/1983 |
| RU | SE 9703875 | * | 4/1999 |

* cited by examiner

10

10

10

10

40

50

50

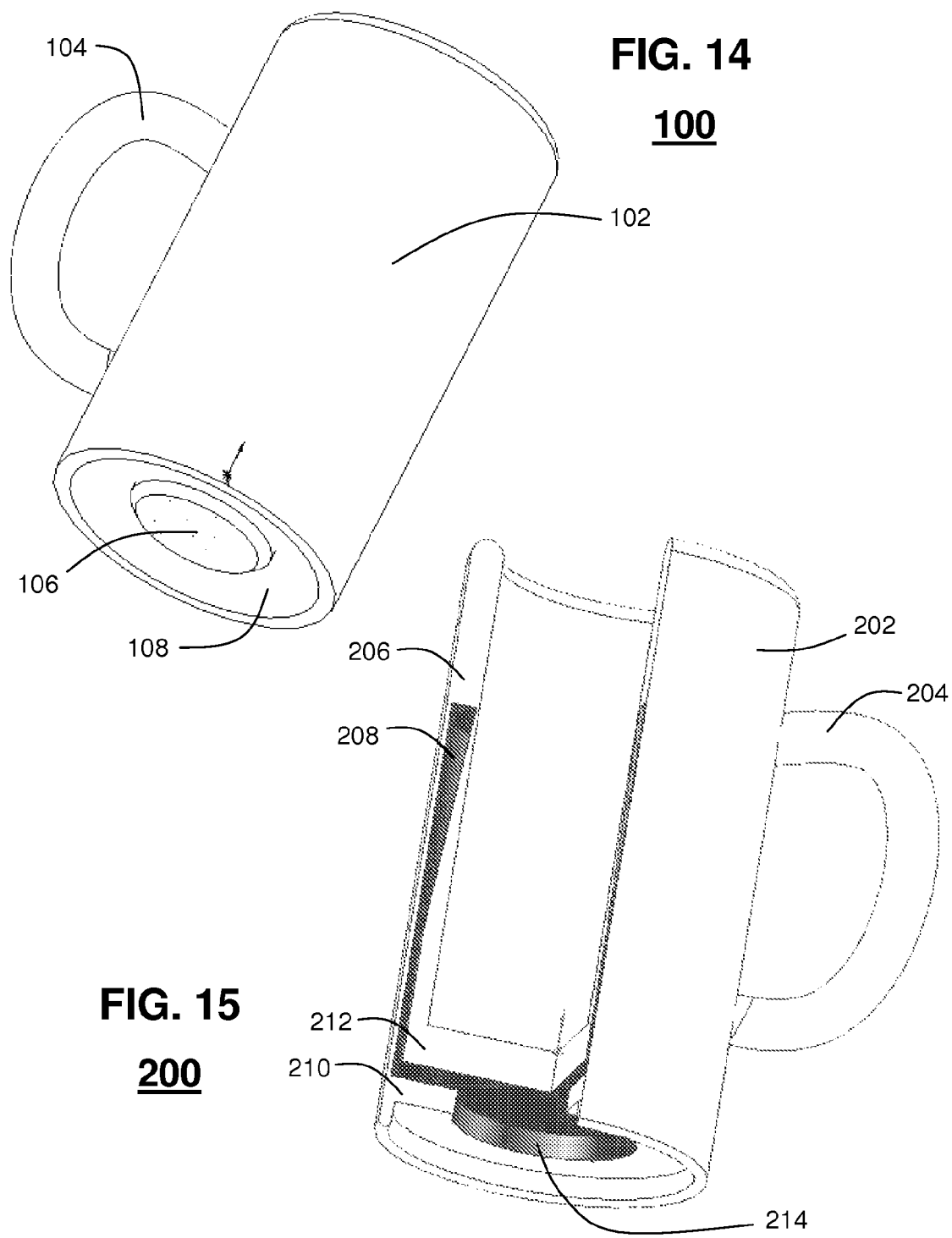

BEVERAGE WARMER APPARATUS

CROSS REFERENCE TO RELATED APPLICATIONS

Not Applicable.

FIELD OF THE INVENTION

This invention relates to beverage warmers, and more particularly, to beverage warmers using candles or self contained heating elements.

BACKGROUND

There are beverage heaters in existence that use an outlet plug for electricity to generate heat, similar to a small stove top. Other beverage heaters use the current available from Universal Serial Bus (USB) connectors on computer desktops and laptops to enable the warming or heating function. There are still other devices that use candles or Sterno® Brand heating devices to warm up or heat butter or other foods. Generally, the source of heat in such devices remain at a fixed distance from the food and are not adjustable. When they are adjustable, the means for adjusting the height of the heat source is not designed for ease of use. Furthermore, such devices also fail to provide a means for easily removing or adding additional heating sources.

Generally such devices either do not utilize self contained heating elements, or are not practical for warming beverages. The devices which do utilize self contained heating elements are generally intended to heat food and are impractical as beverage warmers for several reasons. For example, the cups or containers they use to hold the food would be too hot to lift to take a sip, and these cups are housed in structures which make it too difficult, i.e., impractical to repeatedly remove and put back as one does when taking each sip from a beverage.

The marketplace lacks a self-contained heating or warming device that can be used to conveniently warm up beverages without electricity from a wired electric source. Such a device would be particularly useful in areas where electricity is unavailable or where additional wiring is not desired. Wired products are considered inconvenient for users wishing to frequently move the product (when not in direct use) from one location in a room to another, or from one room to another room. Additionally, during time of leisure people tend to prefer products which do not have wires and are not plugged in for aesthetic reasons, similar to the aesthetic preference for a fireplace over a plugged in portable heater. The desire to maintain a cup or bowl of liquid such as coffee, tea or soup or other substance at a warm temperature at a work space, entertainment area, or other location is becoming an obsession with more and more people in a mobile society with frequent interruptions. Inasmuch as one gets interrupted in the middle of enjoying a warm soup or coffee to take care of another pressing need and returns to a cold beverage, the satisfaction once enjoyed from the warm beverage is severely diminished. A beverage warmer can bring back the satisfaction briefly enjoyed before such interruptions. In addition, many people like to drink slowly and desire that their beverage remain near their preferred temperature.

SUMMARY OF THE INVENTION

Embodiments in accordance with the present invention provide a beverage warmer apparatus that addresses the limitations of the prior art. The design and configuration of the beverage warmer apparatus provides ease of use in manipulating or adjusting the height of a heat source and further enables warming of beverages without electricity from a wired source.

In one embodiment in accordance with the inventive arrangements, the beverage warmer apparatus can include a vertically adjustable platform for holding a self-contained heating element (such as a tea light candle, Sterno can, or other heating element), a gear or pulley mechanism for adjusting the height of the vertically adjustable platform, a support structure anchored at least in part to the vertically adjustable platform, and a top planar member having an aperture therein and further supported by the support structure. The top planar member can be wide enough to enable typical beverage vessels (e.g., bottles, cups, mugs, glasses, and bowls) to fully rest on the top planar member without needing to be located in the center. The aperture in the top planar member can be a central open area small enough such that heat rising from the heating element is generally prevented from causing the rim or a handle of a vessel, or the handle of any utensil in a vessel from becoming undesirably hot. The apparatus can further include a bottom planar member coupled to the support structure. The vertically adjustable platform can be an L-shaped member for holding a horizontally slidable planar member that holds the self-contained heating element. The horizontally slidable planar member can be designed to large enough to hold multiple self-contained heating elements and in one particular embodiment can hold up to at least 2 or 3 tea light candles. The L-shaped member can further include guide rails for enabling the horizontally slidable planar member to slide in and out of the support structure. The top planar member can be a ceramic planar member having an oval shaped hole. The support structure can have posts or walls coupled to the top planar member and if the apparatus has a bottom planar member the support structure can have posts or walls coupled between the top planar member and the bottom planar member.

The beverage warmer apparatus can further include a beverage vessel having a combination of heat insulating and heat conducting materials enabling the maintenance of a more uniform temperature of the beverage regardless of the beverage level within the vessel. The beverage vessel can have a piece of ceramic or other insulating material centrally disposed on the bottom of the beverage vessel. In another embodiment, the beverage vessel can have a heat conductive metallic layer channeled through a substantial vertical portion of the beverage vessel and further having a thermally insulating layer between the heat conductive metallic layer and any beverage that may be contained in the vessel. The insulating layer can vary in thickness, thicker near the bottom, resulting in more heat being provided to higher levels of the vessel.

In other embodiments in accordance with the inventive aspects, the beverage warmer apparatus can include a vertically adjustable L-shaped platform for holding at least one self-contained candle (such as a tea light candle), a gear or pulley mechanism for adjusting the height of the vertically adjustable platform, a support structure anchored at least in part to the vertically adjustable platform, and a top planar member having an aperture therein and further supported by the support structure. The apparatus can further include a bottom planar member coupled to the support structure. The apparatus can further include a horizontally slidable planar member coupled to the L-shaped platform via guide rails where the horizontally slidable planar member holds a candle. The support structure can have posts or walls coupled to the top planar member and the bottom planar member. The vertically adjustable L-shaped platform can use gears to allow the user to selectively maneuver the platform up or down. The apparatus can further include a beverage vessel having a combination of heat insulating and heat conducting materials enabling the maintenance of a more uniform temperature of the beverage regardless of the beverage level within the vessel. Further note, a handle can be provided as part of the height adjustment mechanism where the movement or turning of the handle can directly cause the heating element or an L-shaped member to move up or down using for example a pulley or gear mechanism.

In yet another embodiment, a beverage warmer apparatus can include a vertically adjustable L-shaped platform for holding at least one self-contained tea light candle, a gear or pulley mechanism for adjusting the height of the vertically adjustable platform, a support structure anchored at least in part to the vertically adjustable platform, a horizontally slidable planar member coupled to the L-shaped platform via guide rails where the horizontal slidable planar member holds at least one self-contained tea light candle, and a top planar ceramic member having an oval aperture therein and further supported by the support structure.

The above features and advantages of the present invention will be better understood with reference to the following figures and detailed description. It should be appreciated that the particular devices and methods illustrating the present invention are exemplary only and not to be regarded as limitations of the present invention.

BRIEF DESCRIPTION OF THE DRAWINGS

There are presently shown in the drawings embodiments that are presently preferred, it being understood, however, that the invention is not limited to the precise arrangements and instrumentalities shown.

FIG. 14 is a perspective view of a beverage vessel in accordance with an embodiment of the present invention; and FIG. 15 is a perspective section view of another beverage vessel in accordance with an alternative embodiment of the present invention.

DETAILED DESCRIPTION

Figure 1:
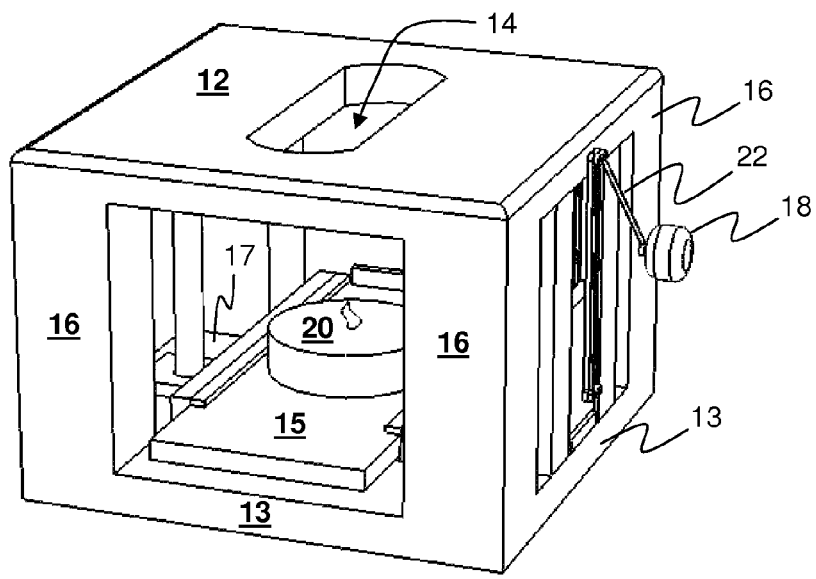
FIG. 1 is a front right perspective view of one embodiment of a beverage warmer apparatus in accordance with an embodiment of the inventive arrangements.
Figure 2:
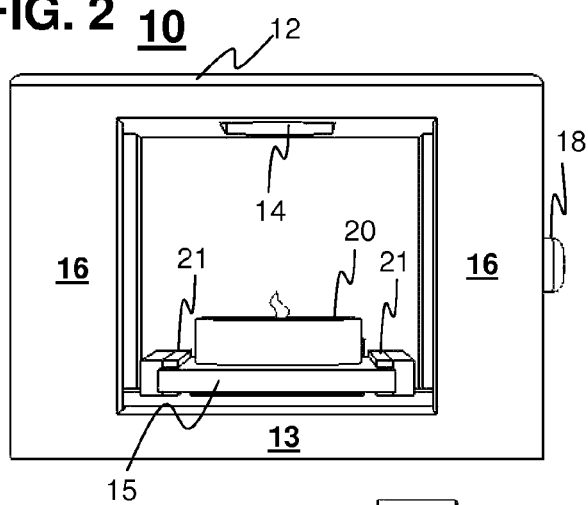
FIG. 2 is a front perspective view of the embodiment of the beverage warmer apparatus of FIG. 1.
Figure 3:
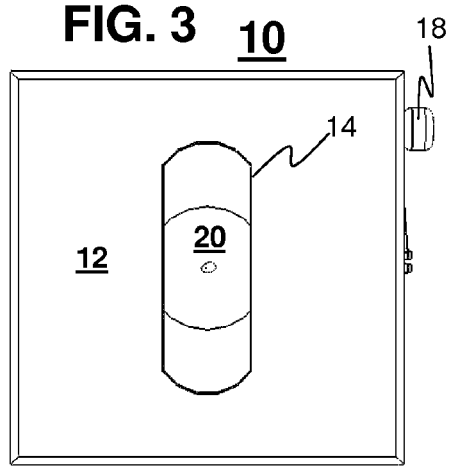
FIG. 3 is a top plan view of the embodiment of the beverage warmer apparatus of FIG. 1.
Figure 4:
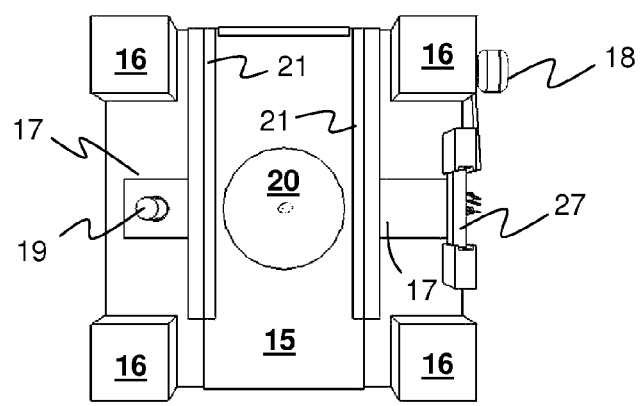
FIG. 4 is a top perspective section view of the embodiment of the beverage warmer apparatus of FIG. 1.
Figure 5:
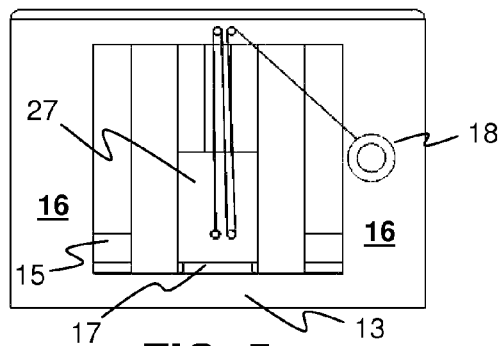
FIG. 5 is a right view of the embodiment of the beverage warmer apparatus of FIG. 1.

While the specification concludes with claims defining the features of the embodiments of the invention that are regarded as novel, it is believed that the devices and method, and other embodiments will be better understood from a consideration of the following description in conjunction with the drawing figures, in which like reference numerals are carried forward.

As required, detailed embodiments of the present device and method are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiments herein.

The terms "a" or "an," as used herein, are defined as one or more than one. The phrase "at least one of" as used herein, is defined as one or more than one. The term "another," as used herein, is defined as at least a second or more. The terms "including" and/or "having," as used herein, are defined as comprising (i.e., open language). The term "beverage" can include and is not limited to liquid refreshments such as coffee and tea and can further include all foods which are liquid or semi-liquid such as soups, fondues, butter, dips, gravy, sauces, melted cheese and even aromatic materials or other materials not intended to be ingested. The term "vessel" can include cups, mugs, steins, bowls, bottles or any other container for holding a beverage. The term "directly causes" as in "turning the handle directly causes the heating element to move up or down" means that as the handle turns, the heating element moves up or down. There can be several parts between the two, as there are when a car's steering wheel directly causes the tires to turn to the left or right. The term "generally flat" does not necessarily mean smooth, but, for example regarding top planar member 12, that any lack of smoothness does not create a material utility difference for holding up a vessel as compared to a flat and smooth surface. For example, for the purpose of holding up a motor vehicle as in the current context, the top surface of a cobblestone road and the top surface of an asphalt road would equally be considered "generally flat." For an example with top planar member 12, if a checkerboard were painted on top and half the black squares were drilled out leaving holes, or drilled partially into leaving divots, it would still qualify as "generally flat."

Referring to FIGS. 1-10, a beverage warming apparatus 10 is illustrated that can be used to keep hot beverages hot or at least warm or can be used to warm up a beverage. As noted above, there are beverage heaters that already exist which use an outlet plug for electricity to generate heat, but embodiments herein will use a self-contained heating element such as a candle to provide the heat instead of electricity. A user's vessel (such as a cup, mug or bottle) can rest on the beverage warming apparatus 10 instead of on an ordinary coaster, thus keeping it hot for the duration of the consumption, whether a few minutes or a few hours.

The beverage warmer apparatus 10 can include a top planar member 12 that is generally flat and extended, with an open area near its center. The top surface of planar member 12 can serve as a vessel-resting surface and can be wide enough such that typical beverage vessels may fully rest thereon, without needing to be located in the exact center. In contrast to a cup of butter, which is intended to remain on a stand for the duration of each use (e.g., duration of a meal or multi-course meal), beverages are picked up for sips and replaced several times during each use. Understandably, a user desires that this operation be simple and convenient, as is the case with the design of top planar member 12, and in contrast to stands where a vessel is inset into the stand or is supported in the stand by a rim on the vessel or by the vessel's sloping sides.

The top planar member 12 can include a central open area 14 or aperture near its center. This central open area can be a hole, or if part of the "hole" extends to an edge, it can be described as an indentation. The central open area 14 can be small enough such that ordinary coffee mugs which do not taper much near the bottom tend to cover or almost cover the central open area 14, even when not placed in the exact center of top planar member 12. This combination of the size of the central open area 14, and the width of the top planar member 12, generally prevents heat rising from the heating element from causing the rim or a handle of the vessel, or the handle of any utensil in the vessel, from becoming undesirably hot. This is also in contrast to stands for heating food, which do not have these heat blocking design elements, as their vessel is intended to remain on the stand for the duration of each use.

Figure 11:
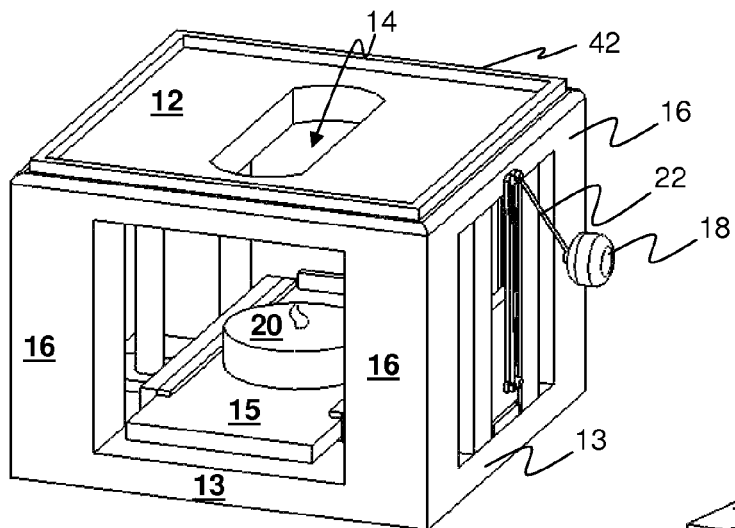
FIG. 11 is a front right view of another embodiment of a beverage warmer apparatus in accordance with an embodiment of the inventive arrangements.
Figure 12:
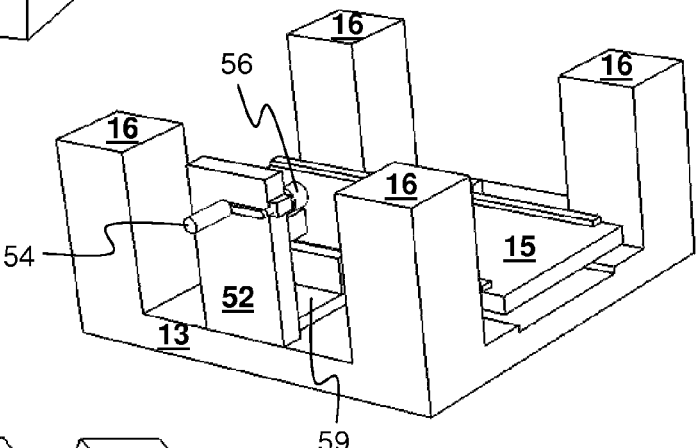
FIG. 12 is a perspective section view of an alternative beverage warmer apparatus using a gear in accordance with an embodiment of the inventive arrangements.
Figure 13:
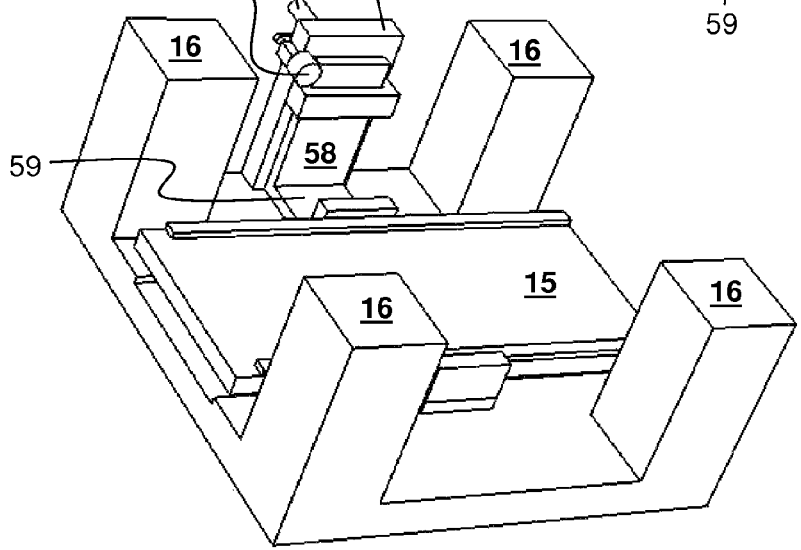
FIG. 13 is another perspective section view of the alternative beverage warmer apparatus of FIG. 12 in accordance with an embodiment of the inventive arrangements.

The beverage warmer apparatus 10 can include a vertically adjustable platform 17 for holding a self-contained heating element 20 (such as a tea light candle, Sterno can, or other heating element), a gear (see item 54 in FIGS. 12 and 13) or pulley mechanism 18 and 22 for adjusting the height of the vertically adjustable platform 17, a support structure 16 anchored at least in part to the vertically adjustable platform 17, and a top planar member 12 having the aperture 14 and further supported by the support structure 16. The apparatus 10 can further include a bottom planar member 13 coupled to the support structure 16. The vertically adjustable platform can be an L-shaped member (see members 17 and 27 in FIG. 4) for holding a horizontally slidable planar member 15 that actually holds the self-contained heating element 20 in this embodiment. In this particular embodiment, the horizontally slidable planar member 15 can be a portion of the vertically adjustable platform 17. The horizontally slidable planar member 15 can be designed to hold multiple self-contained heating elements 20 and in one particular embodiment can hold up to 3 (or more) tea light candles. The L-shaped member (17 and 27) can further include guide rails 21 for enabling the horizontally slidable planar member 15 to slide in and out of the support structure. The top planar member 12 can be a ceramic planar member having an oval shaped hole 14. The support structure 16 can have posts or walls coupled to the top planar member and if the apparatus has a bottom planar member 13 the support structure 16 can have posts or walls coupled between the top planar member 12 and the bottom planar member 13. In an alternative embodiment of a beverage warmer apparatus 40 as shown in FIG. 11, the beverage warmer apparatus 10 of FIGS. 1-10 can further include a rail 42 along the periphery of the top planar member 12 to reduce the chances of a mug or bowl from slipping off of the top planar member 12.

In one particular embodiment, the beverage warmer apparatus 10 can consist for example of two square tiles 4.5 inches by 4.5 inches. The top tile (planar member 12) serving as the "coaster", can be supported at each corner by 4 posts forming a part of the support structure 16. A top view diameter of the apparatus can generally be less than six (6) inches. The 4 posts can be supported by the other tile or the "base" or the bottom planar member 13. The coaster can have an oval shape hole 14 in its center allowing the heat from the candle or the self contained heating element 20 to go through. The "L" shaped bar (formed from members 17 and 27) can extend down the center of the right side of the apparatus, then along the top of the base or bottom planar member 13 towards the left side of the apparatus 10. In so far as the size of a typical coaster seems to also be the ideal size (e.g., about 5 inches in diameter with little thickness) for an ordinary coaster, it is desirous that a beverage warmer which serves as a coaster differ in size by as little as possible from that of an ordinary coaster. As such, the beverage warmer apparatus 10 in a particular embodiment can have an overall footprint of less than 6 inches in diameter, and a height of less than 6 inches. The overall height of the beverage warmer apparatus 10 in this particular embodiment can be 3.75 inches.

In this particular embodiment, another ceramic rectangle (15) having the dimensions of 4.5"×2"×0.2" can rest on the L-shaped bar and can be further supported along its long sides by guide rails 21. This ceramic rectangle or member 15 can be considered the heating element holder or the "candle holder" where candles are placed. The dimensions described above are particularly suited for the type of candles known as "tea lights" which are round candles having the dimensions of 1.5" in diameter, 0.6" tall. Tea light candles are each housed in their own metal casing which contains the wax when melted. These tea lights are commonly available at retail stores or online from candle suppliers.

Generally, only one candle is needed, however the oval hole 14 as illustrated in the coaster or top planar member 12 provides open space for the heat of 2 candles, when desired. The candle holder or member 15 can hold up to 3 candles, providing room for "on deck" candles ready to be lit. The space on the candle holder or member 15 can also enable a burned out candle to remain thereon while still hot. In other words, a recently extinguished candle need not be removed when still hot, but can instead be pushed along by a new candle. The candle holder or member 15 can also include a backstop to avoid candles from slipping out a back side of the apparatus 10. The candle holder or member 15 can optionally be slid out, held level by the rails 21 like a drawer, to ease in adding or removing candles or heating elements. The rails can be attached to the adjustable platform 17, and/or the member 15.

Figure 6:
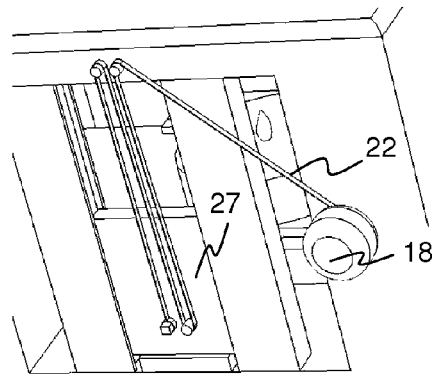
FIG. 6 is a more detailed view of the pulley mechanism of the embodiment of the beverage warmer apparatus of FIG. 1.
Figure 7:
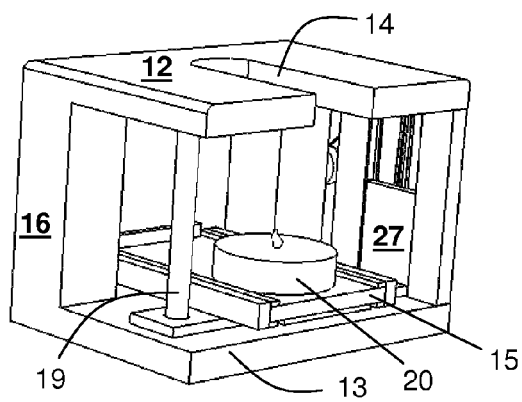
FIG. 7 is a left front perspective section view of the embodiment of the beverage warmer apparatus of FIG. 1.
Figure 8:
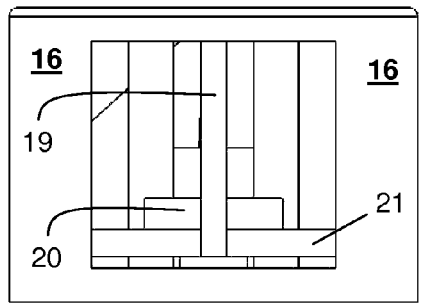
FIG. 8 is a left view of the embodiment of the beverage warmer apparatus of FIG. 1.
Figure 9:
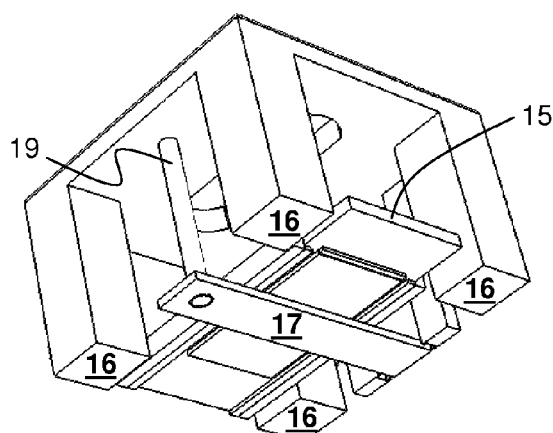
FIG. 9 is a bottom perspective section view of the embodiment of the beverage warmer apparatus of FIG. 1.
Figure 10:
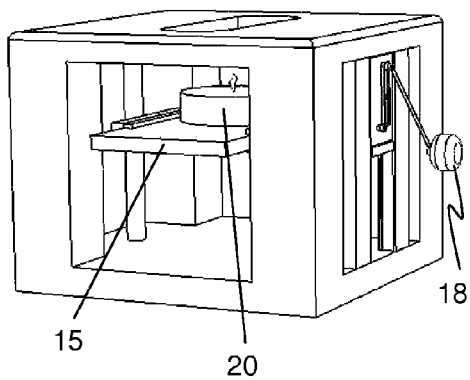
FIG. 10 is a front right perspective view of the embodiment of the beverage warmer apparatus of FIG. 1 with a vertically adjustable platform in a raised position.

Operationally, as can be best understood with respect to a review of FIGS. 1, 2, 5, 6, and 10, the beverage warmer apparatus can use a pulley mechanism that utilizes chords, bands or chains 22 and a handle 18 for adjusting the pulley mechanism. One end of the chord 22 can be affixed to a shaft connected to the handle 18, and another end can be affixed to the L-shaped member wall 27 as illustrated in FIG. 6. As the handle is turned in one direction, the vertically adjustable platform 17 is raised. An additional chord (not shown) can be similarly affixed which pulls the L-shaped member wall 27 down. As the handle is turned in the other direction, the vertically adjustable platform 17 is lowered. Alternatively, the chords need not be rigidly affixed to the shaft, but can instead consist of a single chord with both its ends affixed to the L-shaped member wall 27, one end for pulling up, the other for pulling down. The single chord can be wrapped around the shaft (or a drum on the shaft) a particular number of times, such that the friction between the chord and shaft is sufficient to prevent slippage, except when the user is turning in the "up direction" (e.g., clockwise) when the L-shaped member wall 27 is already at its highest level, or counterclockwise when the L-shaped member wall 27 is at its lowest level. The alignment of the platform 17 is aided as it vertically traverses up and down using a guide pole 19 as can be clearly illustrated in FIGS. 4, 7, 8, and 9. The height of the vertically adjustable platform 17 (and horizontally slidable member 15) can remain fixed using friction. For example, the frictional forces on the shaft and L-shaped member wall 27 can be greater than the gravitational forces pushing down on the platform 17. Hence, until a user assists in lowering the height of the platform 17 or member 15, the platform 17 or member 15 will generally remain in place. The pulleys can turn, or be fixtures that don't turn but serve as pulleys.

Of course, other mechanisms can be used to allow the user to conveniently adjust and maintain the distance between the heating element and the vessel, by adjusting the height of the heating element or the height of the vessel, using a pulley mechanism or other mechanisms. The height adjustment mechanism can include among a jack, screw, ramp, scissor lift, gear or lever. These mechanisms need not include an L-Shaped member (e.g., a screw jack), and can include devices such as a ratchet, winch, spring, or counterbalance. For example, the embodiment shown in FIGS. 12 and 13 uses a gear mechanism in a beverage warmer apparatus 50. The beverage warmer apparatus 50 is essentially the same as the beverage warmer apparatus 10 of FIGS. 1-10 except that it uses the gear mechanism to raise or lower a platform 59 (and the member 15). The platform can also be a part of an L-Shaped member that includes a wall member 58 and the platform 59. As shown, the gear mechanism can include a handle 54 coupled to a gear 56 that lifts or lowers the wall member 58 up and down relative to a wall member 52. The wall member 52 can also be considered as part of the support structure 16. Although not absolutely necessary, the wall member 52 can be attached to both the bottom planar member 13 and the top planar member (not shown). The handle or interface, i.e., the part or parts that the user touches when adjusting height, need not be turned, but may alternatively or optionally be moved by another means, e.g., pulled, pushed, pressed, squeezed, switched, levered, dragged, drawn or toggled. For example a handle may consist of a section of the L-shaped member, which the user slides up and down, the system held in place by friction or counterbalances. In another embodiment the coaster could be supported by a postage-scale type mechanism, its height being automatically adjusted by the combined weight of the vessel and beverage.

The height adjustment mechanism should be convenient to use as in the case where moving the handle directly causes the heating element to change height, because in practical use, the user will often adjust the heating element height several times during the consumption of a beverage, for one reason or another. For one example, a beverage when initially poured may be hotter or cooler than the user's desired temperature. The user may thus initially set the candle low or high accordingly, later moving it towards the center, and then lower it again towards the end of the consumption. The adjustable height for the heating element is also particularly useful when heating beverages of varying thicknesses. For example, a soup (or beverage) that is thicker, like a chowder as opposed to a broth type soup, retains more heat. The thicker soup will be significantly hotter than "thinner beverages" with other factors being equal. Thus, with chowder the user would set the candle lower when maintaining heat. The same is true when there is something thicker on top, like French onion soup with bread and cheese on top, or coffee with whipped cream on top, since these beverages would have a higher equilibrium temperature (the temperature the beverage would approach, from either above or below, if left alone with a candle at a given height) resulting in the user choosing to set the candle or heating element lower.

The beverage warmer apparatus can further include a beverage vessel 100 or 200 as shown in FIGS. 14 and 15 respectively having a combination of heat insulating and heat conducting materials enabling the maintenance of a more uniform temperature of the beverage regardless of the beverage level within the vessel. The beverage vessel 100 or 200 can include a handle 104 or 204 and an insulated canister wall 102 or 202. The beverage vessel 100 can have a piece of ceramic or other insulating material 106 centrally disposed on the bottom 108 of beverage vessel 100. In the embodiment of FIG. 15, the beverage vessel 200 can have a heat conductive metallic layer 208 channeled through a substantial vertical portion of the beverage vessel and further having a thermally insulated layer (206, 210 and 212) between the heat conductive metallic layer 208 and any beverage that may be contained within the vessel. The thermally insulated layer can be of varying thickness. The beverage vessel 200 can also include a piece of ceramic or other insulating material, or even metal (not shown) in an opening area 214 of the bottom of the beverage vessel 200. Note, a ceramic piece added to the bottom of the mug or soup bowl helps to reduce temperature swings based on beverage level, specifically it reduces the amount that the temperature of the beverage increases as the level of the beverage decreases from full to near empty. The ceramic piece can further serve to reduce the chances of a beverage sticking to the bottom center of the bowl or cup (just as, for example, soup on a stove top can stick to the pot if the heat is too hot). The ceramic piece added prevents this from happening by eliminating the tendency of a small central area of the bottom of the vessel (the area directly over the heat source) to be exceedingly hot.

As noted above, the beverage warmer apparatus can operate well with conventional cups, mugs, bowls, saucers and the like, but can operate well with the beverage vessels 100 and 200 described above. With an ordinary mug, as the liquid gets hotter when the beverage level becomes closer to empty, the user will not always be able to adjust the height in perfect accord with these effects, resulting in occasional states where the beverage is too hot or too cold. The beverage vessels 100 and 200 can assist in giving the user a greater margin of error regarding such adjustments, allowing them to be less attentive to when and how far to adjust the heat source or candle. The beverage vessels 100 and 200 are thus designed utilizing a combination of heat insulating and heat conducting materials such that a more uniform temperature is maintained from full to near empty. In the embodiment of beverage vessel 200, the areas 208 containing metal allow the vessel to conduct heat higher up the vessel. Note, the ceramic bottom 212 above the lower area of the metal 208 can be made thicker than usual to insulate the lower portion.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

I claim:

1. A beverage warmer apparatus, comprising:
   a vertically adjustable platform for holding a self-contained heating element, wherein the vertically adjustable platform comprises an L-shaped member for holding a horizontally slidable planar member that holds the self-contained heating element;

a mechanism for adjusting the height of the vertically adjustable platform;

a support structure anchored at least in part to the vertically adjustable platform;

guide rails on the L-shaped member for enabling the horizontally slidable member to slide in and out of the support structure; and a top planar member that is generally ceramic and flat and having an aperture therein and further supported by the support structure, wherein the top planar member is suited for resting a beverage vessel thereon.

2. The beverage warmer apparatus of claim 1, wherein the apparatus further comprises a bottom planar member coupled to the support structure.

3. The beverage warmer apparatus of claim 1, wherein the self-contained heating element is a tea light candle.

4. The beverage warmer apparatus of claim 1, wherein the top planar member is a ceramic planar member having an oval shaped hole therein.

5. The beverage warmer apparatus of claim 1, wherein the support structure comprises at least four posts coupled to the top planar member.

6. The beverage warmer apparatus of claim 1, wherein the horizontally slidable planar member is large enough to hold at least 2 tea light candles.

7. The beverage warmer apparatus of claim 1, wherein the mechanism for adjusting the height comprises a pulley, crank, jack, screw, ramp, scissor lift, gear, lever, ratchet, winch, spring, or counterbalance.

8. The beverage warmer apparatus of claim 1, wherein a handle is provided as part of the height adjustment mechanism, the moving of which directly causes the heating element to move up or down.

9. The beverage warmer apparatus of claim 1, wherein a handle is provided as part of the height adjustment mechanism, the turning of which directly causes the heating element to move up or down through the use of a pulley or gear mechanism.

10. The beverage warmer apparatus of claim 1, wherein a handle is provided as part of the height adjustment mechanism, the turning of which directly causes the heating element to move up or down, through use of an L shaped member.

11. The beverage warmer apparatus of claim 1, wherein the top planar member is wide enough such that typical beverage vessels may fully rest thereon, without needing to be located in the exact center.

12. The beverage warmer apparatus of claim 11, wherein the top planar member is wide enough and the central open area small enough such that heat rising from the heating element is generally prevented from causing the rim or a handle of a vessel, or the handle of any utensil in a vessel, from becoming undesirably hot.

13. The beverage warmer apparatus of claim 1, wherein the overall height of the apparatus is less than 6 inches.

14. The beverage warmer apparatus of claim 13, wherein the top view diameter of the apparatus is less than 6 inches.

15. The beverage warmer apparatus of claim 1, wherein the beverage warmer apparatus further comprises a beverage vessel having a combination of heat insulating and heat conducting materials enabling the maintenance of a more uniform temperature of the beverage regardless of the beverage level within the vessel.

16. The beverage warmer apparatus of claim 1, wherein the beverage warmer apparatus further comprises a beverage vessel having a piece of ceramic or other insulating material centrally disposed on the bottom of beverage vessel.

17. The beverage warmer apparatus of claim 1, wherein the beverage warmer apparatus further comprises a beverage vessel having a heat conductive metallic layer channeled through a substantial vertical portion of the beverage vessel and further having a thermally insulated layer of varying thickness between the heat conductive metallic layer and any beverage that may be contained within the vessel.

18. A beverage warmer apparatus, comprising:
a vertically adjustable L-shaped platform for holding at least one self-contained candle;
a horizontally slidable planar member coupled to the L-shaped platform via guide rails, wherein the horizontal slidable planar member holds the self-contained candle and enables the self-contained candle to slide in and out along the guide rails;
a crank or pulley mechanism for adjusting the height of the vertically adjustable platform;
a support structure anchored at least in part to the vertically adjustable platform; and
a top planar member having an aperture therein and further supported by the support structure.

19. The beverage warmer apparatus of claim 18, wherein the apparatus further comprises a bottom planar member comprised of ceramic and coupled to the support structure.

20. The beverage warmer apparatus of claim 18, wherein the self-contained candle is a tea light candle.

21. The beverage warmer apparatus of claim 20, wherein the support structure comprises at least four corner posts coupled to the top planar member and the bottom planar member.

22. The beverage warmer apparatus of claim 18, wherein the vertically adjustable L-shaped platform uses gears to user selectively maneuver the platform up or down.

23. The beverage warmer apparatus of claim 18, wherein the beverage warmer apparatus further comprises a beverage vessel having a combination of heat insulating and heat conducting materials enabling the maintenance of a more uniform temperature of the beverage regardless of the beverage level within the vessel, wherein at least a portion of the heat insulating materials are on a centrally disposed bottom portion of the beverage vessel.

24. A beverage warmer apparatus, comprising:
a vertically adjustable L-shaped platform for holding at least one self-contained tea light candle;
a gear or pulley mechanism for adjusting the height of the vertically adjustable platform;
a support structure anchored at least in part to the vertically adjustable platform;
a horizontally slidable planar member coupled to the L-shaped platform via guide rails, wherein the horizontal slidable planar member holds the at least one self-contained tea light candle; and
a top planar ceramic member having an oval aperture therein and further supported by the support structure.

* * * * *